United States Patent Office 3,129,191

Patented Apr. 14, 1964

3,129,191
DIELECTRIC FOAMS

Mortimer H. Nickerson, Winchester, and Herbert S. Schnitzer, Springfield, Mass., John Eliot Curtis, Amenia, N.Y., and George D. Patterson, Thompsonville, Conn., assignors, by mesne assignments, to De Bell & Richardson, Inc., Hazardville, Conn., a corporation of Connecticut No Drawing. Filed Mar. 9, 1960, Ser. No. 13,707
1 Claim. (Cl. 260—2.5)

This invention relates to a dielectric foam and methods of making such foams, and more particularly such foams providing a light-weight material of controlled uniform dielectric values, suitable for forming microwave lenses and similar structure of relatively large size.

This application is a continuation-in-part of application Serial No. 642,339, filed February 26, 1957, now abandoned.

The increasing use of radar and other high-frequency shortwave electrical radiation has resulted in increased attention being directed to materials of controlled dielectric. By controlled dielectric material is meant compositions of matter which can be made to have a previously determined dielectric constant, this dielectric constant being determined by the electrical characteristics desired in the electronic equipment which will utilize the material. A specific example is the fabrication of microwave lenses. Since aircraft, particularly the military aircraft, utilize such controlled dielectric materials in their electronic gear, it is desirable in the interest of reducing weight that these materials should be as light as possible.

The dielectric constant of a material is an electrical characteristic related to the forces between two electrical charges separated by the material in question. The number value characteristic of any material is on a scale with air as the reference point and having the value one. The effect of the dielectric constant of the material on microwave radiation passing through it may be compared to the effect of the refractive index of glass on light, and lenses for microwaves can be made of uniform, controlled dielectric materials just as lenses for light are made from good optical glass of desired refractive index.

As in the case with glass lenses for light, lenses for microwaves to be efficient must be made of extremely uniform (dielectrically) materials. The uniformity must exist not only throughout the mass but also directionwise. As in the case of certain glasses and crystals, it is possible to have different refractive indexes depending upon the axis along which the light travels. So in the case of dielectric materials nonuniformity can manifest itself as different dielectric values along different axes of the same mass. For lens materials the mass must be uniform in all directions; that is, isotropic.

Each composition of matter has its own characteristic dielectric constant. The dielectric constant of a mixture of materials has a value usually intermediate between those of the two materials separately. Artificial dielectrics can therefore be prepared by mixing two materials in the proper proportion, one of the materials having a dielectric higher than that desired and one having a lower value. Synthetic plastic materials lend themselves readily to this type of preparation. Most plastic materials have a relatively low dielectric, but by the addition of certain fillers which have a higher dielectric, a uniform composition can be prepared having a predetermined dielectric constant. For small items of equipment this procedure is entirely satisfactory; but in making large, massive items even the relatively light plastics usually result in structures which are very heavy, and weight consideration becomes a problem. Furthermore, the production of large masses of plastic material, free of strains and completely uniform, is exceedingly difficult and presents many of the problems which are encountered when one tries to make a large glass lens. Not only would a large microwave lens have considerable weight if fashioned from solid plastic, but attempts to do this with solid plastics have never been completely successful for the above-mentioned reasons.

It is a primary object of the present invention to provide a light-weight plastic material having more precisely controlled, uniform dielectric values than materials now available coupled with better physical properties for a given use. More specifically, one purpose is the provision of a filled polyepoxide resin foam having those characteristics. Polyepoxide resin foams offer particular advantages because they are cross-linked resins and thus offer superior dimensional stability, resistance to heat and to solvents than do the thermoplastic resins such as polyethylene or polystyrene. The polyepoxide resins capable of forming rigid foam structures suitable for the purposes of this invention are those which contain two or more epoxide groups

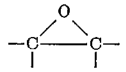

or in terminal form

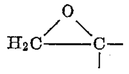

per molecule. A typical epoxy resin of this class has the chemical structure

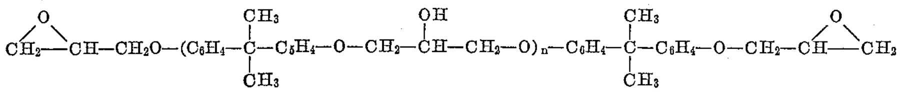

where $n$ may be zero or any integer greater than 0.

Other and further objects and advantages will be made apparent in the following specification and claims.

We are aware that dielectric materials have been proposed for microwave lens use comprising metal particles in a foamed matrix of polyethylene, or polystyrene, but such proposals have not resulted in that degree of control of the dielectric values needed in the production of lenses and other devices where high efficiency is required, and exact and reliable electrical characteristics with adequate choice as to physical characteristics are highly desirable.

We have found that large masses of plastic material with controlled dielectric from which large microwave lenses may be formed can be successfully made using a foaming composition based on the class of polyepoxide resins, above referred to, to which has been added suitable fillers, as later described, in the proper proportions to bring the dielectric constant of the resulting foamed mass to the desired value. Not only does the invention make it possible to make larger structures than it is possible to make by conventional molding or casting of solid resins, but because of the control of the density of the foamed product the weight of such structure can be kept at a minimum. Furthermore, the foaming operation, when conducted by the preferred techniques of the invention, yields masses which are highly uniform in density and dielectric constant, not only throughout the mass but directionwise. As an example, the techniques of this invention have made possible the preparation of a lens blank which was a cylindrical section measuring 30 inches in diameter and 10 inches thick from which the proper curvature of the lens could be carved.

The polyepoxide resin foam which is used in carrying out this invention may be prepared as described fully in our copending applications Serial No. 642,382, filed February 26, 1957, now abandoned, and Serial No. 821,-346, filed June 19, 1959. While this process for making the foam is preferred, it is not intended to be limiting to this invention, since this invention is concerned only with the control of the dielectric of this or similar foams.

The dielectric constant of solid polyepoxide resin, catalyzed and cured by the conventional amine-type catalyst has a value of about 3.8. If such a chemical composition is produced in the form of a foamed, cured structure the dielectric constant goes down and of course approaches the value of 1 as the specific gravity of the foam approaches zero. For example, an unloaded polyepoxide resin foam having a specific gravity of 0.18 (11.4 lbs./cubic foot) and made according to the procedures described in the said copending applications above referred to has a dielectric constant of 1.38. For most microwave lens applications the desired dielectric constant is in the range of 2–4, although it is recognized that certain applications may require higher or lower dielectric constants, and this range is not to be interpreted as limiting. To be useful for lens purposes the dielectric constant of the foam must be increased. It was found that the polyepoxide resin as used in this composition would take fairly substantial amounts of fillers.

A number of different materials having dielectric values higher than the polyepoxide resin foam, were tried as fillers in order to increase the dielectric of the foam. Aside from the dielectric value of the filler it was found that particle size, dispersability, the nature of the interfacial contact established between the filler and resin both before, after and during cure were factors in securing uniform dielectric values of the product. These factors were found particularly important if the advantages of a fine uniform cellular structure of the foam were to be preserved and realized.

Among the fillers investigated were aluminum powder, titanium dioxide, carbon black and other metal powders. Of these, by far the most effective was found to be aluminum powder, finely ground so that the largest percentage of the particles was less than 25 microns in size. Although a larger particle size can be used to control the dielectric, the small size is preferred. Since most aluminum powder is ordinarily obtained by disintegration of very thin aluminum foil, a larger particle size tends to be more plate-like in shape with one of its three dimensions being smaller than the other two. Such plate-like particles in a foaming mass tend to orient themselves, and this can result in a nonuniformity of dielectric constant in the finished mass, depending upon the angle at which the dielectric is measured.

It will be seen that two degrees of freedom are provided in controlling the dielectric of the foamed, loaded resin. The natural dielectric constant of the base resin used in making the foam is modified by the degree to which it is expanded; in other words, by the density in pounds per cubic foot of the finished structure. The dielectric of the finished foam is also controlled by the amount of aluminum which has been used as a filler in the base resin. To obtain a finished product with a given dielectric one can, for example, use a low-density foam with a relatively high amount of aluminum loading; or one can use a higher density foam with a smaller amount of aluminum. These degrees of freedom are highly advantageous since they give the engineer designing the equipment freedom to choose between emphasis on very light-weight or emphasis on greater strength, as would be obtained from the higher density foams.

Close control of the dielectric value of the foam is an important factor in the construction of efficient microwave lenses and from extensive experimental work with polyepoxide resin foams containing finely-divided aluminum, we have derived the following equation which holds generally true for dielectric in the range 2–4:

$$\text{Dielectric constant, measured at 1 megocycle} = 1.25 + (KxDxA)$$

where K is a constant experimentally determined by us to have the value (for polyepoxide foams) 0.00795, D is the density of the foam in terms of pounds per cubic foot, and A is the weight percent of aluminum in the final product.

Certain considerations limit the extent to which the resinous composition can be loaded with aluminum powder. The base resin composition as it exists just prior to the foaming operation is a liquid mass, but the addition of the solid filler such as aluminum increases the viscosity.

For the purposes of the invention, and as described in said copending applications we have found that for such foaming purposes the most suitable polyepoxide resins are those which have a high degree of epoxy reactivity or epoxide equivalent but which are relatively low in molecular weight. For purposes of this application, epoxide equivalent is defined as the weight in grams of the resin in question which contains one gram molecular weight of the epoxy group—

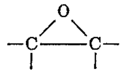

Typical of resins which meet this requirement are Epon 828 and Epon 834, sold by the Shell Chemical Company. These "Epon" resins are glycidyl polyethers of a dihydric phenol, represented by the structural formula given in column 2 and differing in epoxide equivalent weights, epoxide equivalent weight being the weight in grams which contains 1 gram mol of an epoxy group. Epon 828 has an epoxide equivalent weight of 185 to 205 and Epon 834 has an epoxide equivalent weight of 225 to 290. A resin such as Epon 828 will take loading with aluminum powder to the extent of about 30 parts by weight of the powder to 100 parts of the mix ready for foaming; but beyond this the increasing viscosity of the mixture makes it difficult to handle. Lower viscosity polyepoxide resins having the necessary reactivity would obviously take a higher degree of aluminum filling.

The following examples are illustrative of the teachings given above. These examples are illustrative only and are not intended to be limiting.

*Example I*

A 6" x 6" x 6" foam block was prepared from the following ingredients:

| | Grams |
|---|---|
| Epon 828 resin | 1200 |
| Diglycol Laurate S (first addition) | 22.8 |
| MD 7100 aluminum powder (manufactured by Metals Disintegrating Co.) | 288 |
| Diethylene triamine (first addition) | 32.4 |
| Ammonium bicarbonate | 10.8 |
| Diglycol Laurate S (second addition) | 23.0 |
| m-Phenylene diamine | 122.3 |
| Diethylene triamine (second addition) | 2.6 |

The first portion of Diglycol Laurate S (diethyleneglycol monolaurate) and the aluminum powder were first dispersed in the resin. Then the other ingredients were added and the block was poured, foamed, and cured as described in the above-mentioned copending applications. The resulting dielectric material, having a density of 20.4 pounds per cubic foot and an aluminum content of 16.7% by weight had a measured dielectric constant of 4.02, which compares closely with the calculated figure of 3.96.

*Example II*

A foam block in the form of an octagonal solid measuring 24 inches across the flats and 8 inches thick was prepared from the following ingredients:

| | Grams |
|---|---|
| Epon 834 | 18,000 |
| 30XD aluminum powder (manufactured by Reynolds Metals Co.) | 1296 |
| Diethylene triamine (first addition) | 284 |
| Ammonium bicarbonate | 173 |
| Diglycol Laurate S | 654 |
| m-Phenylene diamine | 989 |
| p,p'-Methylene dianiline | 989 |
| Diethylene triamine (second addition) | 54 |

The resin was first warmed to about 50° C. and the aluminum powder dispersed in it. Then the other ingredients were added and the block was poured, foamed, and cured as described in said copending applications. The resulting dielectric material, having a density of 17.5 pounds per cubic foot and an aluminum content of 5.81% by weight, had a measured dielectric constant of 2.06, which is equal to the calculated figure.

*Example III*

A foam block in the form of an octagonal solid measuring 34 inches across the flats and 12 inches thick was prepared from the following ingredients:

| | Pounds |
|---|---|
| Epon 834 | 118.72 |
| 30XD aluminum powder | 13.57 |
| Diethylene triamine (first addition) | 1.62 |
| Ammonium bicarbonate | 1.34 |
| Diglycol Laurate S | 4.48 |
| m-Phenylene diamine | 10.36 |
| p,p'-Methylene dianiline | 2.59 |
| Diethylene triamine (second addition) | 0.31 |

The resin was first warmed to about 50° C. and the aluminum powder dispersed in it. Then the other ingredients were added and the block was poured, foamed, and cured as described in our copending applications. The resulting dielectric material, having a density of 19 pounds per cubic foot and an aluminum content of 8.95% by weight, had a measured dielectric constant of 2.54, as compared with the calculated figure of 2.60.

*Example IV*

A 6" x 6" x 6" foam block was prepared from the following ingredients:

| | Grams |
|---|---|
| Epon 834 resin | 1100 |
| Gastex carbon black (Godfrey L. Cabot) | 220 |
| Diethylene triamine, first addition | 18 |
| Ammonium bicarbonate | 12 |
| Diglycol Laurate S | 40 |
| m-Phenylene diamine | 55 |
| p,p'-Methylene dianiline | 55 |
| Diethylene triamine, second addition | 3 |

The carbon black was dispersed in the resin at about 50° C., then the other ingredients were added and the block was poured, foamed, and cured as described in the above-mentioned copending applications. The resulting dielectric material had a density of 15.5 pounds per cubic foot and a dielectric constant of 1.62 at one megacycle.

Other fillers such as copper dust, magnesium powder, zinc dust, and titanium dioxide have been substituted for the aluminum powder and carbon black used in the above examples for the preparation of controlled dielectric foams. We prefer to use aluminum powder, however, since aluminum has a low specific gravity, and, compared with most other materials, gives a large increase in dielectric constant per unit weight used.

What is claimed is:

A composition of matter comprising a cured foam of a glycidyl polyether of a dihydric phenol having an epoxide equivalent weight in the range of 185 and 290 of substantially uniform density and containing uniformly dispersed aluminum powder having a particle size not substantially exceeding 25 microns, the composition having a substantially isotropic dielectric constant between 2 and 4 dependent on the density of the foam and the weight percentage of the aluminum powder.

References Cited in the file of this patent

UNITED STATES PATENTS

| | | |
|---|---|---|
| 2,528,933 | Wiles | Nov. 7, 1950 |
| 2,653,139 | Sterling | Sept. 22, 1953 |
| 2,739,134 | Parry et al. | Mar. 20, 1956 |